United States Patent Office 2,800,964
Patented July 30, 1957

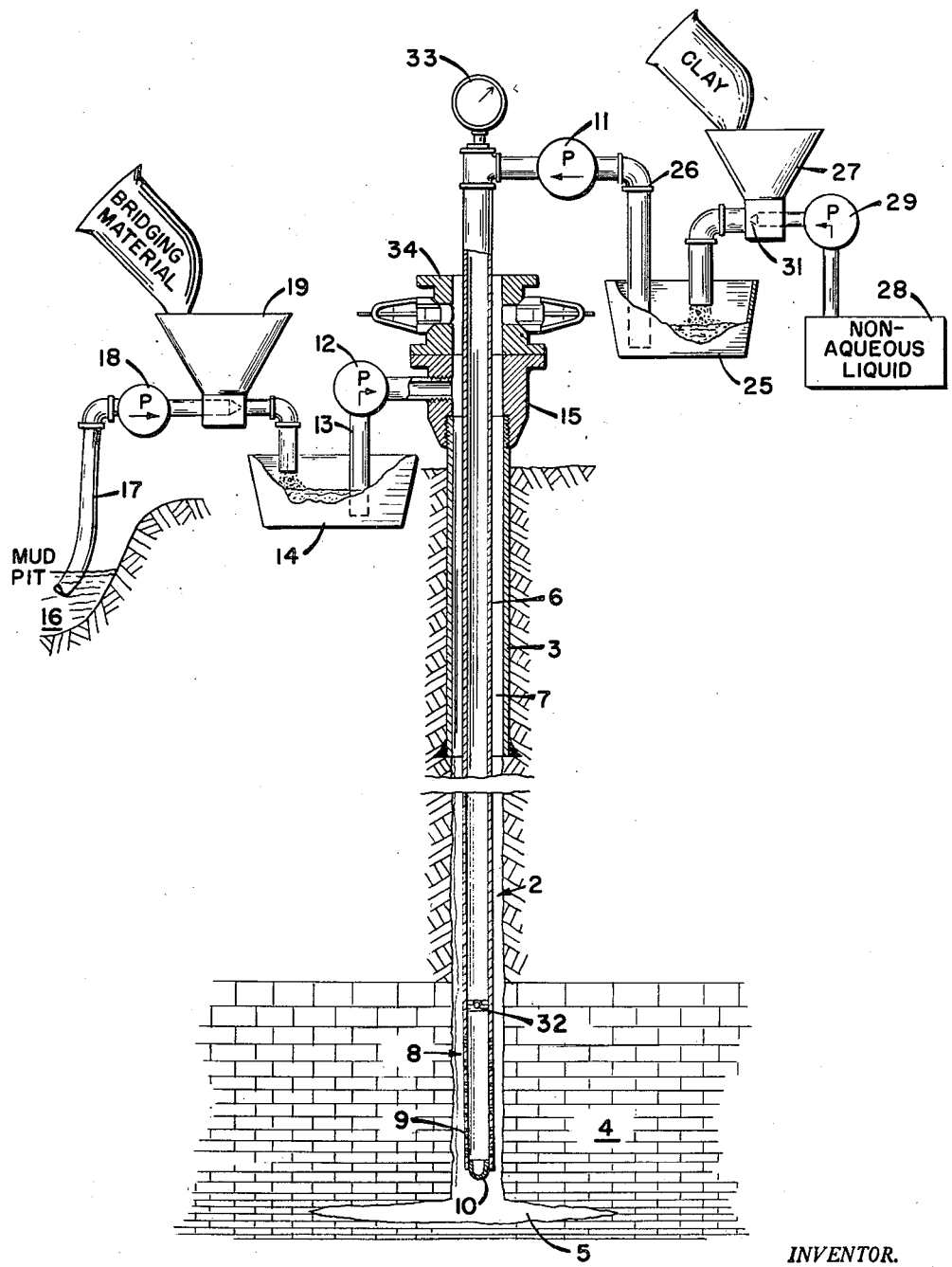

2,800,964
RECOVERY OF LOST CIRCULATION IN A DRILLING WELL

David A. Garrick, Tulsa, Okla., assignor to Pan American Petroleum Corporation, a corporation of Delaware Application January 5, 1954, Serial No. 402,203

2 Claims. (Cl. 166—29)

This invention relates to the recovery of lost returns in a well drilled by the rotary process. More particularly, this invention relates to the plugging of formations penetrated by a well during drilling to prevent the loss of whole mud to such formations and the loss of circulation in the well.

During the process of drilling deep oil and gas wells by the rotary process, the drilling fluid including both the liquid and solid phases, hereinafter referred to as whole drilling fluid, may be lost to a formation or what is often referred to as a lost circulation zone. Some formations have intergranular permeability in the range of 100 darcies or greater and such formations are known to permit the flow or loss of whole drilling fluid. That is, the finely divided solids such as colloids which are carried by the liquid phase are too small to bridge over the intergranular flow channels in these highly permeable formations and, therefore, the whole mud does not produce a filter cake on the well wall as is customary when formations having normal permeability are penetrated. Loss of whole drilling fluid to these highly permeable formations may be and quite often is prevented or overcome by addition to the drilling fluid of one or more of the so-called lost circulation recovery or bridging materials. These materials are divided generally into three classes as is well known in the art. They include the granular, fibrous, and lamellar types.

Whole drilling fluid in many instances is also lost in formations containing fractures, both natural and induced. In all these latter types of formations, the prevention of lost returns or the recovery of circulation during drilling is more difficult than in the case of loss of drilling fluid returns to intergranular permeability. Occasionally the lost circulation recovery materials can be used to prevent loss of the whole fluid to these formations or to recover circulation once it has been lost. In some cases, circulation can be re-established in a well penetrating formations having these large flow channels by injecting a hydraulic cement into the flow channel and allowing it to set. Recovery of circulation by either method is often impossible, however, because of the inability to bridge the openings with pumpable lost circulation recovery materials and because of the impossibility of filling the flow channels with cement and holding the cement in the channel for sufficient time to permit the cement to set. For these and other reasons the loss of returns in a drilling well is often a serious problem causing considerable expense and in some cases requiring abandonment of an expensive hole.

It is, therefore, an object of this invention to provide an improved procedure and composition for recovering circulation in a drilling well. A more specific object of this invention is to provide a process for plugging highly permeable zones in a formation which take whole mud, the process employing a composition having initially sufficient plasticity to produce a high angle of repose in such lost circulation zones and to resist movement due to the flow of subterranean waters and eventually to produce a rigid impermeable body which resists displacement when subjected to high drilling fluid pressures. It is still a more specific object of this invention to combine within a well two or more pumpable constituents which, when mixed near a lost circulation zone, produce a highly viscous and unpumpable mixture in the well and to displace the mixture into a lost circulation zone and plug that zone at least temporarily so that circulation of the drilling fluid in a drilling well can be re-established and that zone will not cause any further loss of drilling fluid. These and other objects of this invention will become apparent from the following description. In this description reference will be made to the accompanying drawing which is a schematic diagram partially in cross section of a well and the apparatus used in practicing this invention.

In brief, this invention comprises combining within a well a bridging material, a non-aqueous slurry of finely divided clay and an aqueous liquid such as drilling mud to produce a mixture in the well which is too viscous or plastic to be pumped, i. e., to pass through a pump, but which can be displaced by surface pumps into a lost circulation zone penetrated by the well. When this plastic mixture is displaced into a lost circulation zone of the fractured or intergranular type, it plugs the fracture or other flow channels so that drilling with complete drilling fluid returns may be resumed.

Referring now specifically to the drawing, a well 2 having a protective string of casing 3 has been drilled to a formation 4 which contains a highly permeable fracture or lost circulation zone 5. The permeability of this lost circulation zone is so high that whole drilling fluid is permitted to flow into the formation. That is, the bottom hole pressure within the formation is inadequate to support a full column of drilling fluid in the well and, therefore, when drilling fluid is pumped down through drill pipe 6, the level of drilling fluid in the annular space 7 between the drill pipe and casing will be lower than the earth's surface—circulation will be lost. When circulation is lost, as is well known, there is always danger of sticking the drill pipe or that the column of drilling fluid in the well will be too light to prevent entry of oil or gas into the well and a blow-out may occur. Accordingly, it is generally considered desirable not only because of the expense from the loss of drilling fluid but because of the other hazards of drilling without circulation of the drilling fluid that circulation be re-established soon and generally as soon as possible.

Typically, a lost circulation zone occurs at the bottom of a well unless, as for example, the density of the drilling fluid is increased after a weak zone has been passed causing induced fractures which permit loss of the whole drilling fluid. If no such change in the drilling operations has been made, the lost circulation zone is typically assumed to be at the bottom of the well and no survey is made for this zone. If, on the other hand, some change has been made in the drilling procedure as, for example, the addition of weighting material to the drilling fluid or the production of a fracture by rapid lowering of the drill pipe, then it is generally considered desirable first to locate the lost circulation zone before an attempt is made to plug that zone. To locate the lost circulation zone, the drill pipe 6 is withdrawn from the well and a survey made to determine where the drilling fluid is leaving the well. This zone where the drilling fluid is leaving the well may be detected by a number of survey means. For example, permeability surveys and temperature surveys have been found to indicate such zones with ease.

After the lost circulation zone has been located, the drill pipe is again lowered into the well, this time desirably with a mixing sub 8 located at the lower end in place of the bit which has been removed and left at the surface. The mixing sub which may comprise a piece of drill pipe of any length, for example, 10–20 feet, has a number of jets 9 which may be perforations or holes drilled in the periphery for the purpose of jetting fluid pumped through the drill pipe into fluid pumped through the annular space 7 and producing a thorough mixture of the two. The jets may be radial or tangential. Preferably, the jets, which are short ¼–½ inch pipe nipples welded into the sub with the external surfaces flush, have their axes at a slight inclination upwardly from the horizontal.

The number of jets is governed by the cross-sectional area of the jets and the drill pipe, the total cross-sectional area of all jets being substantially less, e. g., 50 percent, than the cross-sectional area of the drill pipe, so as to produce a high velocity jet in the area surrounding the sub. The sub is closed on the bottom by a plug 10. In some cases a jet type bit may produce adequate mixing of the two components so that pulling of the drill pipe to remove the bit and install the jetting sub is unnecessary.

The drill pipe is lowered into the well until the sub 8 is at about the depth of the lost circulation zone. In some cases, it is preferred that the mixing sub be placed above the lost circulation zone from about one joint to as much as two or three stands of drill pipe, which is typically 180–270 feet. When the drill pipe has thus been lowered and the sub is in position, the upper end of the drill pipe is connected to the pump 11 either directly as indicated or through the kelly and swivel so that the drill pipe can, if desired, be rotated. Pump 12 which may be the regular rig mud pump having a suction line 13 to tub 14 may be connected to the casing head 15. Aqueous liquid which is typically mud from pit 16 is pumped via suction line 17 by pump 18 through a jet mixer 19 where bridging materials are added to the aqueous liquid. The aqueous or mud slurry of bridging material is discharged into tub 14 from which pump 12 takes suction and injects it into the annular space 7. Pump 11 takes suction on fluid in tub 25 via suction line 26. This tub is filled with a slurry of finely divided hydrophilic solids, typically a finely divided or powdered water swelling clay, in a hydrophobic or non-aqueous liquid which is mixed in hopper 27. The non-aqueous liquid is stored in tank 28 and discharged by pump 29 through jet 31 in the hopper to mix the hydrophilic solids and the liquid and produce a pumpable non-aqueous liquid slurry of these materials.

The bridging material added either to the aqueous or non-aqueous liquids at the surface and eventually mixed within the well with the other liquid is desirably inert in both liquids. That is, the bridging material preferably is not soluble in and does not react with either liquid or with any solid in either liquid. A preferred material is a granulated woody material such as hard nutshells, as described in copending United States application Serial Number 269,529 Fischer and Scott, or fruit pits. Other inert strong granules such as water and oil insoluble plastics may sometimes be substituted for the granulated woody bridging materials. The bridging material is ground into particles or granules of a wide particle size range, all of which may be suspended in a liquid and carried as a dilute slurry. The granules have a particle size range smaller than about 1 inch in maximum dimension, preferably in the pumpable range, for example, from about 4 mesh U. S. sieve through about 100 mesh or smaller. In this preferred range granules of all intermediate sizes are included and are divided so that about ⅓ of the particles are in and cover the range 4–10 mesh and about ⅔ are in and cover the range 10–100 mesh. Black walnut, coconut, pecan, and similar hard lightweight nutshells and peach, plum, cherry, and similar fruit pits are preferred. The concentration of these bridging materials in the drilling mud, or to the non-aqueous liquid, may be varied over a substantial range. The higher the concentration within pumpable limits, the more quickly a lost circulation zone may be plugged. The concentration may vary from about 5 to about 100 pounds or more per barrel, preferably between about 25 and 50 pounds of granular nutshells being added to a barrel of drilling mud having a Marsh funnel viscosity in the range 30–40 seconds. Higher concentrations may be used in more viscous muds.

The hydrophilic solids used to produce the slurry may comprise any of the various types of water-swelling clay used in the drilling fluid art, but preferably it is a finely ground, e. g., 325 mesh or smaller, bentonitic clay used in the drilling fluid art to produce high gel strength muds. The non-aqueous liquid used to produce the slurry may comprise any liquid which does not effect hydration of the clay. Alcohols and hydrocarbon liquids, typically crude oil or a refined oil such as gasoline, kerosene, diesel oil, or the like, are preferred. This non-aqueous liquid is, as indicated above, mixed with the clay in hopper 27 by passing the liquid through jet 31. The ratio of non-aqueous liquid to clay in the slurry may be varied over a substantial range, but preferably the amount of clay in the liquid is about as high as can be picked up from tub 25 by pump 11. The amount of solids to produce a pumpable slurry has been found to fall in the range of less than about 500 pounds of finely divided solids per barrel of non-aqueous liquid. A range of 300–500 pounds of solids per barrel of liquid is generally satisfactory. Typically, 400 pounds of total solids per barrel of hydrophobic liquid (diesel oil or kerosene) are used. In some cases, oil well cements such as Portland, Pozzolana, or gypsum cement or any of the oil well cements may be added to the non-aqueous liquid slurry to increase the strength of the mixture after it has been allowed to set. The proportion of cement to clay added to the hydrophobic liquid in hopper 27 may vary from about ½ to about 4 parts cement per 1 part clay by weight. Inasmuch as low cement/clay ratios tend to produce a mixture having a lower tensile strength and inasmuch as a high cement/clay ratio may produce a mixture harder than the formation in which it is placed, an intermediate ratio of cement to clay is generally preferred. The preferred range comprises a ratio of about 1 part cement to 1 part clay by weight. This slurry with either clay or clay and cement may then be discharged directly into well 2 near the lost circulation zone 5 through jets 9.

In the preferred operation, a back pressure valve 32 is placed in the bottom of the drill pipe adjacent the mixing sub 8 so that as the drill pipe is lowered into the well with the mixing sub affixed, entry of drilling fluid into the drill pipe is prevented. In case the back pressure valve 32 is not inserted or in some cases even when the back pressure valve is employed, a quantity, typically 3–5 barrels or more, of the non-aqueous liquid without solids is injected into the drill pipe and displaced to the bottom as a spacer. It is sometimes desirable also to discharge at least a small part of this spacer liquid into the mixing sub and out through jets 9 whereby the non-aqueous liquid slurry of hydrophilic solids which follows is not permitted to come into contact inside the drill pipe or mixing sub with the aqueous liquid. After the spacer liquid has been injected into the drill pipe by, for example, displacing the oil from tank 28 with pump 29 into tub 25 and there picking it up with pump 11 and pumping it into the drill pipe, the clay with or without cement is added to the hopper and the drill pipe is filled. In some cases, particularly where large jets are used in the mixing sub, the bridging material may be added to the non-aqueous liquid simultaneously with the clay or with the clay and cement. An increase in pressure, as indicated by a gage 33, may indicate when the drill pipe has been filled. Alternatively, the amount of non-aqueous liquid and slurry injected into the drill pipe may be measured and when the calculated volume of the drill pipe plus one or two barrels has been pumped into the well, pumps 11 and 29 may be stopped.

Aqueous liquid preferably containing the granular bridging material may be injected into the well by pump 12 as the slurry is displaced down the drill pipe; however, this pump is preferably not started until the drill pipe is full of slurry. Inasmuch as the well at the time circulation is lost is normally filled with aqueous drilling fluid including colloids such as bentonite and starch, it is generaly desirable that additional drilling fluid from the mud pit be pumped into the annulus. However, in some cases it is desirable to inject a special aqueous liquid including the bridging material into the annulus to be mixed with the non-aqueous liquid slurry near the lost circulation zone in the well. In either case, it is generally desirable after the drill pipe has been filled to start pump 12 and to measure either by pump strokes or by other metering devices the amount and rate of aqueous liquid injected into the annulus. The rate of injection of the aqueous liquid into the annulus typically varies from about ½ to about 8 parts by volume of non-aqueous liquid slurry per 1 part by volume of aqueous liquid. The preferred ratio is about 2 volumes of such slurry per volume of aqueous liquid including bridging material.

Where circmlation is completely lost, this aqueous liquid may be injected into the annulus until it is full without closing the upper end. The upper end of the annulus is then closed as with a blow-out preventer 34 so that pressure can be applied to the aqueous liquid in the annular space. By the time the aqueous liquid starts moving down in the well past the mixing sub 8, pumps 11 and 29 are started again to jet the slurry in the drill pipe through jets 9 into the moving aqueous liquid stream. The rate of injection of the slurry is desirably high so that the mixing in the area surrounding the mixing sub is violent or turbulent to facilitate a thorough mixture between the slurry and the aqueous liquid. With 4 inch drill pipe and from ten to fifteen ¼ inch pipe jets in the mixing sub, the slurry is injected at the rate of about 1-10 barrels per minute and preferably at a rate in the range 3-5 barrels or more per minute, and the aqueous liquid is injected at the rate of about 1½ to about 2 barrels per minute. This ratio, however, may be varied depending somewhat upon the free water in the aqueous liquid, i. e., the water not tied up on the clay in the drilling fluid and available for hydration of the clay in the non-aqueous liquid slurry. Generally, in a drilling fluid having a normal viscosity of about 30–50 centipoises and a weight of about 9–11 pounds per gallon, the water available for hydration of the clay in the slurry appears to be adequate when the ratio of slurry to drilling fluid is about 2 to 1. As the viscosity of the drilling fluid increases, the water available for hydration of the solids in the slurry, of course, decreases so that the ratio of aqueous liquid to slurry should proportionately be increased.

With thorough mixing at the mixing sub, as above described, the clay in the slurry begins to hydrate substantially instantaneously when the slurry contacts the aqueous liquid. That is, the clay being preferentially water wet, it is immediately wet by the free water in the mud which displaces and frees the non-aqueous liquid. Within a few seconds, as indicated by tests at the surface, the viscosity of this mixture rises beyond the range normally measurable on viscosimeters—a viscosity similar to the viscosity of mortar, putty, and the like which is, of course, not pumpable but which may be displaced down the well and into the lost circulation zone. Desirably the viscosity or plasticity of this mixture is so high that an angle of repose of about 80–90° can be obtained in a lost circulation zone.

Injection of both the slurry and the aqueous liquid at these high rates is continued until substantially all of the slurry has been injected into the drill pipe. The volume of this slurry may be varied over a substantial range depending upon the experience in any locality or upon the severity of the loss of fluid to a formation. Generally when caverns are encountered or when the loss of returns has been experienced over a long section in a drilling well, the volume of the slurry and, accordingly, the volume of the mixture is higher than when only a small fractured zone has been encountered. The volume of the slurry may be varied from about 5 to 500 barrels or more, but in the typical operation 50–100 barrels of slurry are preferred, at least for the first stage. If this amount of slurry is inadequate, additional stages of the same or greater amounts may, of course, be employed until a zone which takes the whole drilling fluid has been completely plugged. In any case, it is generally desirable finally to obtain a squeeze pressure if possible. A squeeze when it can be detected in view of the high displacement pressure normally encountered in this process is desirable since it tends to indicate that the lost circulation zone has been completely filled with the viscous mixture. In some instances, a squeeze pressure cannot be detected when the mixture is being pumped at high rate. This mixture being thixotropic, the viscosity varies inversely as the rate of shear. The rate of injection of the mixture into the lost circulation zone may, therefore, be decreased after substantially all of the slurry has been injected into the well so as to encourage the development of a higher viscosity within the lost circulation zone. The rate of injection may even be reduced to zero intermittently to facilitate a high rate of shear strength build-up and to determine whether the lost circulation zone has been completely filled. When a squeeze pressure is indicated by an increase in pressure or by failure of the formation to take the mixture at a reasonable pressure, the drill pipe is desirably raised two or three stands to remove the mixing sub out of the area in the well which may be contaminated with the mixture so that any danger of sticking the pipe is avoided. In any case, all of the slurry is displaced out of the drill pipe and the mixing sub and out of the annulus with a follower spacer of non-aqueous liquid such as kerosene or crude oil so as to avoid any possibility of sticking the drill pipe in the well. As the drill pipe is withdrawn from the well, the total volume of the drill pipe including contents which is withdrawn from the well is replaced by a volume of aqueous liquid injected into the well through the annulus so that the mixture in the lost circulation zone will not tend to be swabbed or flowed into the well.

This mixture is allowed to remain undisturbed in the well in the adjacent formations and in lost circulation zones to allow it to develop viscosity and rigidity. That is, being thixotropic, the rigidity increases with time so that if allowed to stand for a long time the plug has less tendency to flow or leak when drilling is resumed. Accordingly, depending upon the experience in the area, the size of a cavern, and the like, the mixture is allowed to set and remain in a quiescent state from about ten hours to about two days or more to develop a plug which is not readily displaced or broken up when the well is reamed or when drilling is again commenced. In the typical operation, a waiting period of about 20–24 hours is allowed before drilling is resumed. When cement is added, the strength of the mixture depends upon the setting time and upon the concentration of the cement in the mixture as well as upon the additives in the drilling fluid which might accelerate or retard the set of the cement, the bottom hole temperature, etc. In some cases, an ordinary cement job or squeeze cement job may be performed following the bentonite bridging material plugging operation to prevent the plug from being washed out.

As an example of the operation of this process in stopping lost circulation in a drilling well, a well near Baxterville, Mississippi, which had a bad lost circulation problem was first treated by injecting bentonite in diesel oil into the drill pipe and drilling mud in the annulus. Two such treatments, each employing about 14 barrels of diesel oil and 40 sacks of bentonite mixed at the bottom of the well at the rate of 2 parts slurry to 1 part mud, were unsuccessful in recovering circulation. Walnut shell granular lost circulation material was then added to the injected drilling fluid stream at the rate of 5 pounds of a 4–100 gradation of shells per barrel of mud and displaced down to the bottom of the well. This was then combined at the mixing sub in the well with the bentonite-diesel oil slurry in the same proportions as in the previous two treatments. After waiting for a period of twenty hours to permit the mixture to develop some rigidity, the plug was drilled and drilling continued to total depth with full drilling fluid returns.

As another example of the operation of this process, a wildcat on a Louisiana State lease at Timbalier Bay, Louisiana, had a complete loss of drilling fluid returns while drilling at 5,083 feet with 10 pounds per gallon mud. Circulation was recovered by allowing the well to stand for two hours. Drilling then proceeded with complete drilling fluid returns to a depth of 9,973 feet. The mud weight was then increased to 11.8 pounds per gallon and fluid returns were again completely lost. A permeability survey indicated that the lost circulation zone was at 5,050 feet. The open-ended drill pipe was then lowered to 4,975 feet and after a spacer of oil, 40 barrels of diesel oil containing from 3 to 4 sacks of bentonite (100 pounds per sack) and 50 pounds of ground walnut shells (Tuf-Plug having ½ of −4+10 mesh, ¼ of −10+40 mesh, and ¼ of −40+100 mesh available from Cherokee Laboratories, Inc., Tulsa, Oklahoma) were pumped down the drill pipe. At the same time mud from the mud pit was pumped into the annular space between the drill pipe and casing at about one-half the rate of injection of the diesel oil slurry. The two fluids were thus mixed at the end of the drill pipe and displaced through the well to the lost circulation zone. After some of the plastic mix was displaced into the lost circulation zone, a high or squeeze pressure developed indicating that the zone had been plugged. The drill pipe was then removed from the well, a bit was installed, and after several hours, drilling was resumed with 11.6 pounds per gallon mud. Drilling then proceeded with complete returns until the well was completed.

From the foregoing, it is manifest that this invention is susceptible of a wide variety of embodiments and that this invention is not limited to the scope of the description which has been given by way of illustration. For example, while the non-aqueous liquid slurry of clay is in the description injected into the well through the drill pipe and the aqueous liquid including bridging material is injected through the annulus, the reverse procedure might in some cases be preferred. Furthermore, it will be apparent as indicated that the clay and bridging material may both be added to the non-aqueous liquid and that soaps or other gelling agents may be added to this liquid to prevent settling of the solids. The invention should be construed, therefore, to be limited only by the scope of the appended claims.

I claim:

1. In a process for recovering circulation lost in a formation penetrated by a drilling well which includes injecting into said well through a first conduit a non-aqueous liquid slurry of finely divided bentonite, injecting into said well through a second conduit an aqueous drilling fluid, intimately mixing said non-aqueous liquid slurry of finely divided bentonite and said aqueous drilling fluid within said well at a depth substantially as great as the depth of said formation, the amount of said finely divided bentonite being sufficient to produce substantially instantaneously a plastic plug too viscous to be pumped, and displacing at least a part of said plastic plug into said formation, the improvement comprising adding to one of said non-aqueous liquid slurry of finely divided bentonite and said aqueous drilling fluid before injecting it into said well between about 5 and about 100 pounds of granular bridging material per barrel of said aqueous drilling fluid to produce a composition which readily bridges and plugs intergranular and fractured flow channels in said formation.

2. A process for recovering circulation lost in a formation penetrated by a drilling well including injecting into said well through the drill pipe a non-aqueous liquid slurry of finely divided bentonite, injecting into said well through the annular space between said drill pipe and the casing in said well an aqueous liquid, intimately mixing said non-aqueous liquid slurry of finely divided bentonite and said aqueous liquid within said well at a depth substantially as great as the depth of said formation by jetting said non-aqueous liquid slurry of finely divided bentonite into a moving stream of said aqueous liquid, the concentration of said finely divided bentonite in said slurry being in the range of 300–500 pounds per barrel of said non-aqueous liquid and the ratio of said non-aqueous liquid slurry of finely divided bentonite being in the range of about ½–8 parts by volume to one part by volume of said aqueous liquid injected into said well, adding to one of said non-aqueous liquid slurry of finely divided bentonite and said aqueous liquid before injecting it into said well between about 5 and 100 pounds of granular bridging material per barrel of said aqueous liquid, whereby said non-aqueous liquid slurry of finely divided bentonite said aqueous liquid and said bridging material produce within said well a composition too viscous to pump, and then displacing said composition into highly permeable flow channels in said formation to plug said flow channels and permit recovery of circulation.

References Cited in the file of this patent

UNITED STATES PATENTS

| | | |
|---|---|---|
| 2,146,480 | Kennedy | Feb. 7, 1939 |
| 2,259,875 | Bent et al. | Oct. 21, 1941 |
| 2,379,516 | Garrison | July 3, 1945 |

OTHER REFERENCES

"Lost-Circulation Materials and Mud Additives," Roy F. Carlson, The Oil and Gas Journal, Dec. 28, 1950, pages 64, 66, and 67.

"Lost Circulation-Causes and Remedies," H. J. Shumate, The Petroleum Engineer, November 1951, pages B–81, B–84, and B–86.

"Composition and Properties of Oil Well Drilling Fluids," Rogers, 1948, Gulf Pub. Co., pages 449–451.